United States Patent [19]
Poeta

[11] Patent Number: 5,359,908
[45] Date of Patent: Nov. 1, 1994

[54] SYSTEM FOR REVERSIBLY TRANSFORMING ROTARY MOTION INTO SELF-GUIDED RECTILINEAR MOTION

[76] Inventor: Rolando Poeta, Piazza Affari, 20, I-24040 Zingonia (Bergamo), Italy

[21] Appl. No.: 915,847
[22] PCT Filed: Dec. 2, 1991
[86] PCT No.: PCT/IT91/00104
§ 371 Date: Jul. 28, 1992
§ 102(e) Date: Jul. 28, 1992
[87] PCT Pub. No.: WO92/10696
PCT Pub. Date: Jun. 25, 1992

[30] Foreign Application Priority Data
Dec. 6, 1990 [IT] Italy ................ 2960 A/90

[51] Int. Cl.⁵ .................................. F16H 21/22
[52] U.S. Cl. .................................. 74/44; 74/51; 123/197.4; 92/140
[58] Field of Search ............. 74/44, 51; 92/140; 123/53 AA, 53 BA, 53 BP, 53 C, 197.1, 197.3, 197.4

[56] References Cited
U.S. PATENT DOCUMENTS

| | | | |
|---|---|---|---|
| 1,169,772 | 2/1916 | Chapman | 74/44 X |
| 1,569,582 | 1/1926 | Scott | 123/197.1 X |
| 1,701,439 | 2/1929 | Canfield | 74/44 |
| 2,417,910 | 3/1947 | Bruegger | 74/44 |
| 2,775,899 | 1/1957 | Vagneur | 74/44 |
| 2,806,431 | 9/1957 | Woydt | 74/44 X |
| 2,963,854 | 12/1960 | Meijer | 74/44 X |
| 3,176,671 | 4/1965 | Stinebaugh | 92/140 X |
| 3,895,620 | 7/1975 | Foster | 123/197.1 |
| 4,898,041 | 2/1990 | Islas | 74/44 |
| 4,979,476 | 12/1990 | Islas | 123/194.4 |

FOREIGN PATENT DOCUMENTS

| | | |
|---|---|---|
| 2746476 | 4/1979 | Germany . |
| 23658 | of 1909 | United Kingdom .......... 123/53 BP |
| 8303125 | 9/1983 | WIPO . |

Primary Examiner—Allan D. Herrmann
Assistant Examiner—David W. Laub
Attorney, Agent, or Firm—Ladas & Parry

[57] ABSTRACT

This system for reversibly transforming rotary motion into self-guided rectilinear motion has the characteristic of being achieved by symmetrically coupling at least two connecting rod-crank (108A, 108B, 107A, 107B) mechanisms, which are mutually associated by the pivots (111) of their connecting rod small ends (110) and by the engagement of identical toothed wheels (112A, 112B) fixed symmetrically into the two specific cranks.

10 Claims, 4 Drawing Sheets

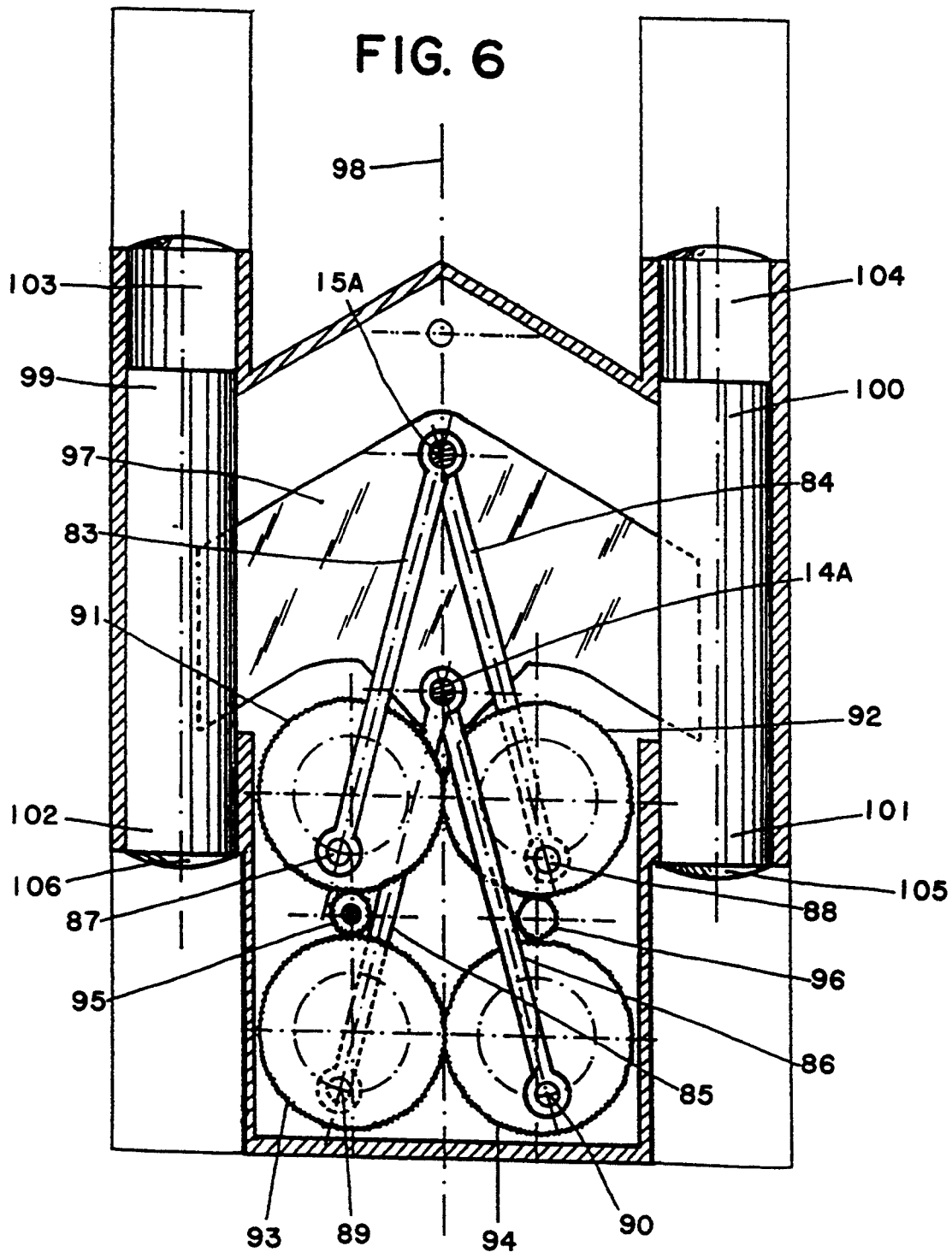

SYSTEM FOR REVERSIBLY TRANSFORMING ROTARY MOTION INTO SELF-GUIDED RECTILINEAR MOTION

BACKGROUND OF THE INVENTION

This invention relates to a system for reversibly transforming rotary motion into self-guided rectilinear motion.

Rotary motion can be obtained from rectilinear motion in various known ways which are differently reversible. The connecting rod-crank mechanism and the cam-tappet mechanism are those which because of their simplicity and symmetricality have found practically unlimited use.

DESCRIPTION OF THE RELATED ART

One of the fields in which the application of these two mechanisms has found major use is the creation of pressure chambers of variable volume, this being the field common to both pumps (of the type comprising blades, axial pistons with an oblique head or plate or pistons controlled by eccentric tracks) and internal combustion engines. The mechanism which on account of its simplicity is most widespread and versatile is represented by piston sliding within a cylindrical chamber by the effect of the movement imposed on it by a connecting rod and crank. This mechanism is in fact used in nearly all internal combustion engines and in high pressure compressors and pumps.

In spite of this, this mechanism has serious conceptual limitations in terms of the necessary obliqueness assumed by the connecting rod during crank rotation. In this respect, this obliqueness creates very high transverse thrusts on the piston, causing it to rub damagingly against the internal cylinder walls. This results in considerable power losses due to friction, the need to lubricate the cylinder within which the piston slides, the need for long pistons (skirt) to reduce the specific transverse pressure, added weight to the piston in the form of the steel piston pin, which is necessarily long as it is diametrical, high quality materials, large engagement clearances detrimental to sealing, and the presence of elastic rings which by virtue of their theoretically impossible roundness result in an engagement with the chamber which is necessarily approximate. In the specific case of internal combustion engines the connecting rod-crank mechanism connected to each individual piston involves considerable over-dimensioning of the parts in relation to the drive torque. This is because the thrust generated on a piston by the explosion is used to implement the passive stages (intake, compression, exhaust) of the other cylinders, passing via the crankshaft. In the case of high pressure hydraulic pumps, all existing types derive conceptually from the use of surfaces (case) inclined to a relative advancement trajectory of a perpendicularly sliding tappet. These types therefore in all cases use a piston (or blade or tappet) which is stressed transversely by the relative operating contact with the rotating member (oblique disc, eccentric reference circumference within which for example radially sliding pistons rotate, etc) and reacts to said transverse forces by rubbing against the walls of the chamber or the like within which it slides to achieve pumping, this rubbing causing wear, power loss, efficiency reduction with time, and limitations on the maximum speed of rotation.

SUMMARY OF THE INVENTION

The object of the present invention is to obviate all the above-noted defects typical of a connecting rod-crank mechanism and of devices conceptually based on relative movement of an inclined plane or cams.

These and further objects will be seen to be attained on reading the ensuing description relating to a system for reversibly transforming rotary motion into self-guided rectilinear motion achieved by symmetrically coupling at least two connecting rod-crank mechanisms, which are mutually associated by the pivots of their connecting rod small ends and by the engagement of identical toothed wheels fixed symmetrically onto the two specific cranks. The ensuring detailed description illustrates the application of said system to variable volume chambers, particularly for liquid pumps, gas compressors, external combustion and internal combustion engines, hydraulic motors and compressed air motors, comprising pistons undergoing alternate rectilinear sliding, guided by the action, on at least two different points of their supporting crosspiece, of common pivots for pairs of identical connecting rods symmetrically mounted on two identical pairs of cranks rotationally connected together, in order to provide said supporting crosspiece for said single or multiple pistons with a movement which is always perpendicular to the line joining the axes of rotation of said pairs of cranks, and which does not involve any rubbing guide action against the walls of the cylinders within which said pistons slide.

This mode of operation of said crosspiece can be applied in all situations in which reciprocating rectilinear motion deriving from or transferred to a member under rotary motion is required, and ranging from swan-neck mechanical presses used in sheet metal processing to the operation of valves in conventional four-stroke internal combustion engines.

BRIEF DESCRIPTION OF THE DRAWING

The invention is illustrated on the accompanying drawings, particularly in relation to its application in forming variable volume chambers, although the illustrated linkages are to be considered as conceptually usable in any other application in which the said transformation of motion from rectilinear to rotary or vice versa is required. Specifically:

FIG. 6 is a middle cross-section through an example of a system with four lateral cylinders with a central double-acting multiple piston and longitudinally opposing connecting rod assemblies.

DESCRIPTION OF THE PREFERRED EMBODIMENTS

Figure 1:
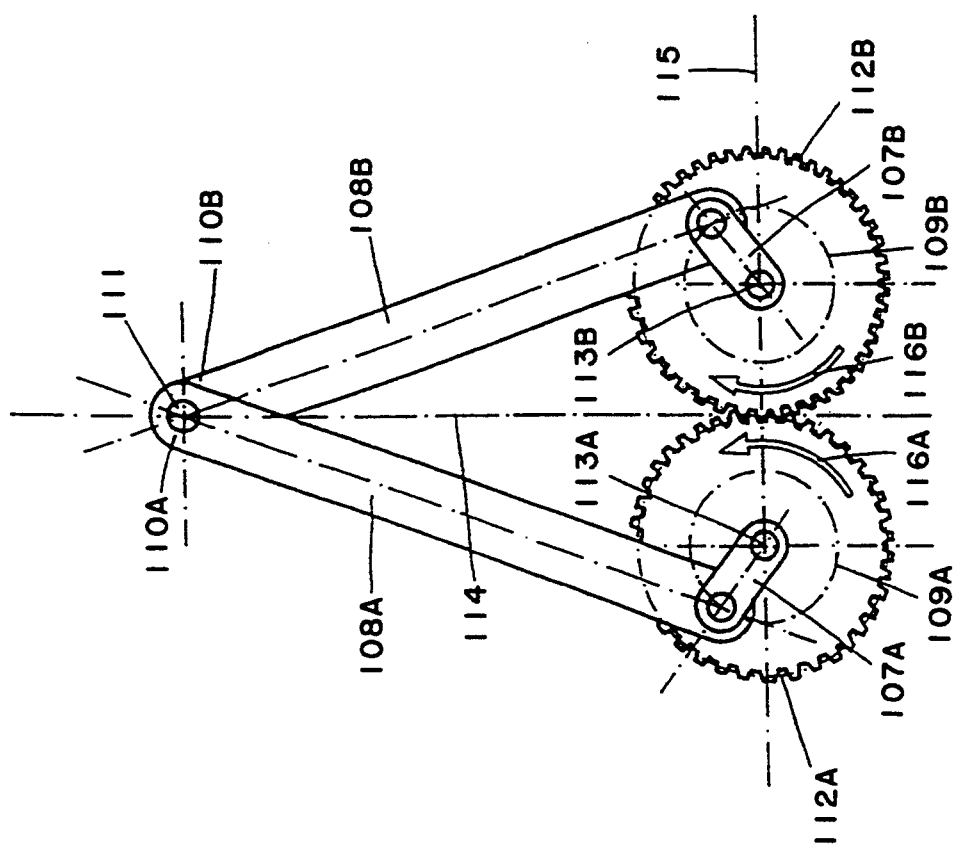
FIG. 1 schematically illustrates the basic concept of the invention.
Figure 4:
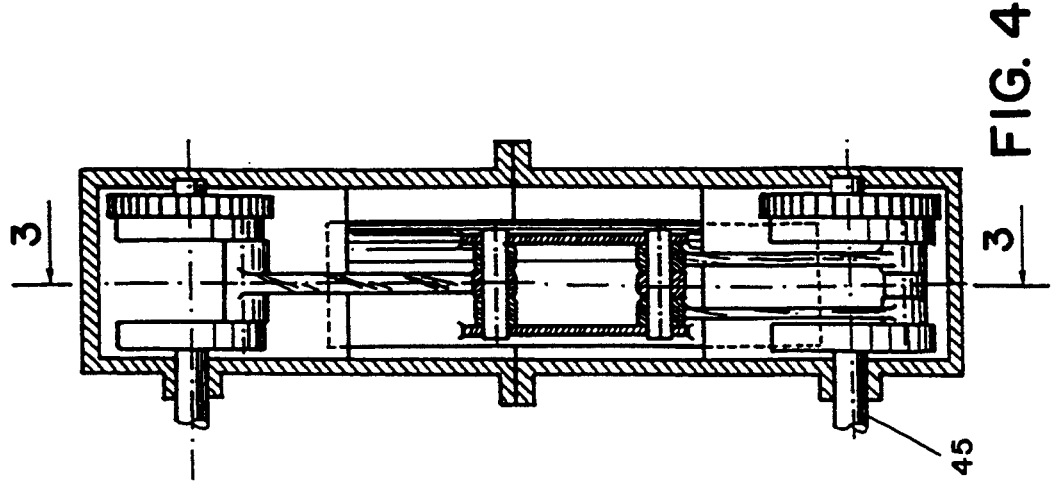
FIG. 4 is a view of the system of FIG. 3 in a direction perpendicular to the preceding.

FIG. 1 illustrates the principle on which the invention is based, and which is applied in the versions illustrated in the other figures. A crank 107A, rotating in an orbit 109A, is associated with a connecting rod 108A provided with a first small end 110A. This connecting rod small end is connected to a second connecting rod small end 110B pertaining to a connecting rod 108B associated with a crank 107B rotating in an orbit 109B. The connection between said small ends of the two connecting rods is made by a common pin 111. The connecting rods 108A and 108B are identical, as are the cranks 107A and 107B.

The connecting rod 107A is rigid with a toothed wheel 112A having its axis of rotation 113A common with the crank 107A.

The crank 107B is rigid with a toothed wheel 112B having its axis of rotation 113B common with the crank 107B.

Figure 2:
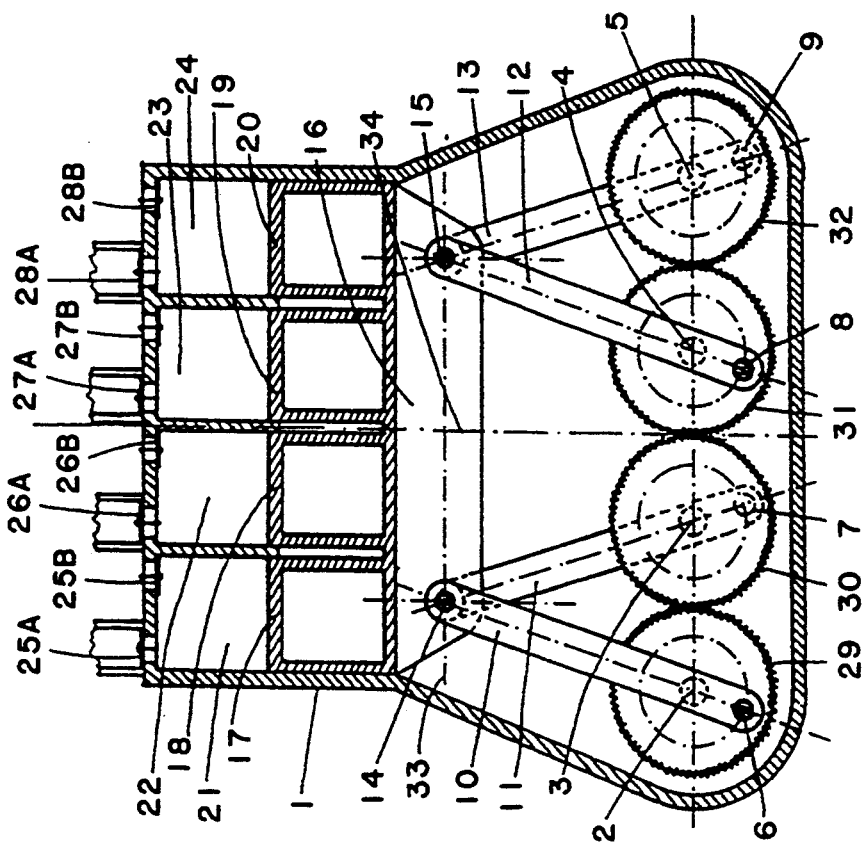
FIG. 2 is a middle cross-section through a four-cylinder system with a single-acting multiple piston, and with connecting rod assemblies immediately side by side, making it particularly suitable for use as a pump or compressor.

The gear wheel 112A engages the gear wheel 112B in an angular position such that the positions of the two cranks 107A and 107B are symmetrical about a central axis 114 perpendicular to the axis 115 joining the two centres of rotation 113A and 113B. In this manner, any rotation 116A of one of the two cranks imposes a symmetrical rotation 116B on the other crank, so determining a rectilinear movement of the common pivot 111 along the same axis 114. Hence the rotation of a crank (107A or 107B) determines a rectilinear movement of a connecting rod small end (110A and 110B) without involving rectilinear rubbing for guide purposes, but only pivotal friction (110-111), which is easily reduced by usual anti-friction techniques typical of bearings (rolling, sliding), which however cannot always be transferred (because of temperature and lubrication problems) to the rectilinearly sliding guide shoe elements of a single connecting rod small end (for example the sliding of pistons in usual internal combustion engines). The essential configuration of FIG. 1 could therefore be applied to all those cases requiring an intermittent thrust always perpendicular to the surface on which it acts, for example to lower the individual spring-returned poppet valves of internal combustion engine, so avoiding the need for lubricating the guide seats for the sliding of the valve stems. In this respect, with this method of operation they are not subjected to any transverse thrust, or to thrust created by the rubbing of their "inverted cups" against the cam contours in the case of direct action (overhead cams), or to thrust created by the arcuate travel of the rocker arm if the stems of the traditional poppet valves are operated indirectly. If more than one valve stem is to be pushed simultaneously, the required force could be advantageously achieved by a crosspiece driven perpendicular to itself by a pair of said double connecting rod-crank assemblies of FIG. 1. Such a double pair give the crosspiece a transverse reaction capacity (as if rectilinear sliding guides were provided) which will be more apparent from the application of this concept to the movement of pistons in a variable volume chamber system, typically a pump or an internal combustion chamber, as shown in FIG. 2. The shafts 2, 3, 4, 5 of cranks carrying respective pins 6, 7, 8, 9 are supported on a frame 1. The big ends of respective connecting rods 10, 11, 12, 13 are pivoted on these crankpins. The small ends of the connecting rods 10 and 11 and of the connecting rods 12 and 13 are pivoted on common shafts, 14 and 15 respectively, fixed to a crosspiece 16. One or more pistons 17, 18, 19, 20 can be present on this crosspiece to operate within conjugate cavities or cylindrical chambers 21, 22, 23, 24. In the roof of these chambers there are usual intake and delivery (or exhaust) valves 25A-25B, 26A-26B, 27A-27B, 28A-28B, either of automatic spring-loaded type in the case of operation as a pump, or of actuated type in the case of operation as an engine.

Figure 3:
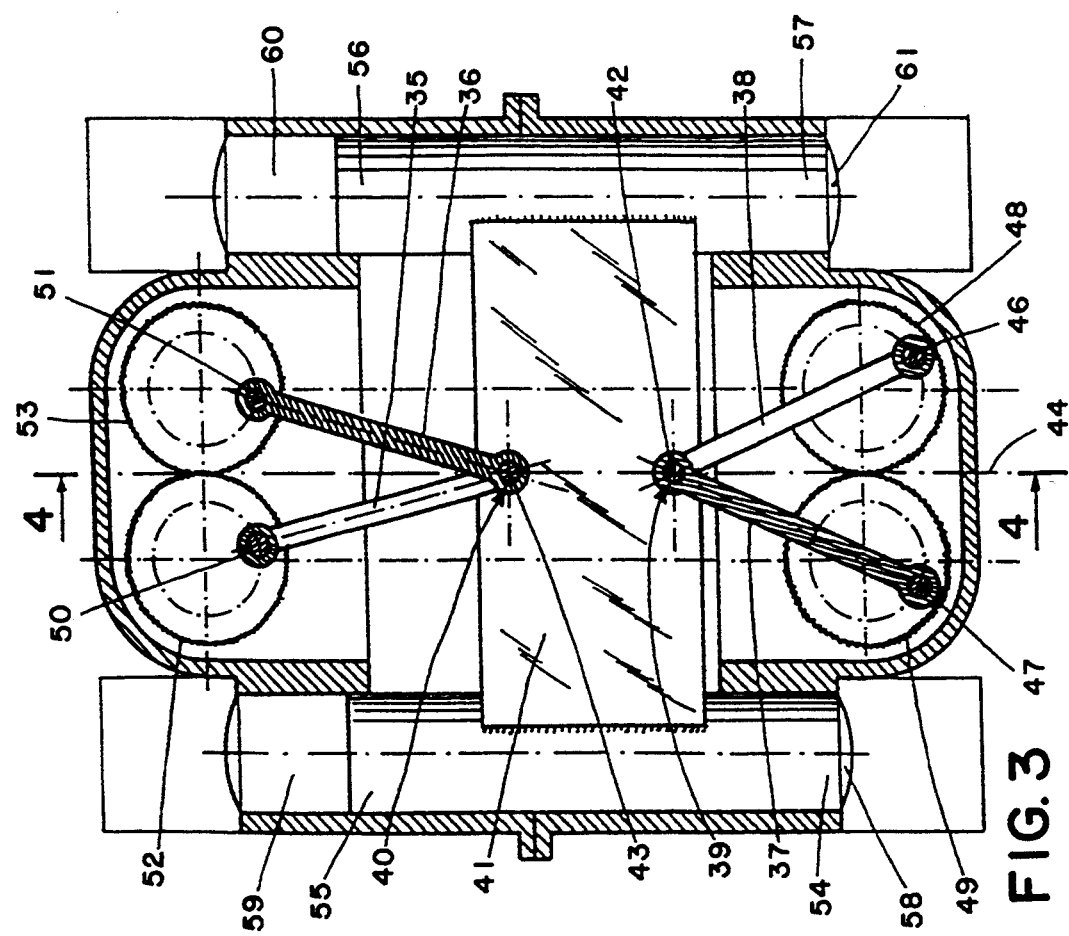
FIG. 3 is a middle cross-section through a four-cylinder system with a double-acting multiple piston and opposing connecting rod assemblies, making it suitable as an internal combustion engine.

On the shafts 2, 3, 4, 5 of the various cranks there also rotate identical toothed wheels 29, 30, 31, 32 which are rigid with the cranks and mutually engage. In this manner, any rotation imposed on a gear wheel (or on any crank rigid with the gear wheels) is transmitted equally to all other gear wheels. In the same manner, any rectilinear movement of a piston 17 or 18 or 19 or 20 creates an equal rectilinear movement in the other pistons. This is due to the fact that the crosspiece 16 on which they are present always moves parallel to itself, i.e. perpendicular to a line 33 joining the two common pins 14 and 15. These two common pins 14 and 15 therefore always move along a rectilinear trajectory and by equal amounts by the effect of the connection effected by the various identical gear wheels 29, 30, 31, 32 between the various cranks 6, 7, 8, 9 which control the piston of the pins 14 and 15 common to the connecting rods 10-11 and 12-13 respectively. The transverse components of the thrusts acting on these connecting rods are always mutually nullified, so that the resultant forces are always and only in a direction 34 which coincides with the direction in which the pistons slide. Any hypothetical transverse force acting on the crosspiece 16 would not create any modification to the said trajectory of the pistons, which can thus slide within their cylindrical chambers with zero clearance, without any contact necessarily arising between them. This hypothetical unbalanced condition would arise by removing from the described configuration the connecting rod 13, the crank 9 and the gear wheel 32. The unbalanced condition would then comprise the connecting rods 10-11 in isosceles configuration cooperating with a further connecting rod 12 with its own crank, all connected together by the gear wheels 29, 30, 31 and the crosspiece 16 with its separate pins 14 and 15. This unbalanced condition is the minimum feasibility condition for a self-guided piston system. This unbalanced version is obviously less preferable than the balanced version comprising two pairs of connecting rods illustrated in FIG. 2, except where particular economy requirements exist. FIG. 3 shows a version of the system of the invention comprising two symmetrical pairs of connecting rods 35-36, 37-38, which are pivoted on pins 39 and 40 on a crosspiece 41 not side by side as in FIG. 2 but in an opposing configuration. The pins 39 and 40 have their axes 42 and 43 spaced from each other by the distance necessary to form a reaction arm for any cross forces present on the crosspiece 41. Given the obliqueness with which these connecting rods operate to the axis of symmetry 44, they form different angles to each other, because of which only one pair of them is connected to an output or input drive shaft, such as the shaft 45 rigid with the crank 46. The other pair freely rotates idly, to simply provide a geometrical guide function. The pair of connecting rods 37 and 38 is mounted with the respective big ends on crankpins 46 and 47. Each of the shafts of these cranks is rigid with its own gear wheel 48, 49, which are identical and mutually engage. The pair of connecting rods 35 and 36 is mounted with the respective big ends on crankpins 50 and 51. Each of the shafts of these cranks is rigid with its own gear wheel 52, 53, which are identical and mutually engage. In this manner, the two pairs of connecting rods guide the crosspiece 41 along a rectilinear trajectory in the same direction as the axis of symmetry 44.

The power take-off, i.e. the drive shaft, can be the shaft of any one of the four cranks, the other three therefore being driven by that one. Pistons 54, 55, 56, 57 are provided on two ends of the crosspiece 41 to slide within respective conjugate chambers 58, 59, 60, 61, in order to alternately compress and expand fluids contained therein. The version of FIG. 3 is extremely suitable for use as an internal combustion engine. In this respect, its pistons 54–55 and 56–57 are aligned, opposing and above all formed within a single body including the actual crosspiece 41. This means that when the chamber 59 has completed intake, the chamber 58 has completed discharge of the burnt gases of a previous stage, the chamber 60 has completed the working expansion due to the explosion, and the chamber 61 has completed the compression preceding the next explosion. Each chamber 58, 59, 60, 61 therefore implements all the necessary four stages in a sequence offset by one stage from that of another chamber. This offers the immense advantage that the drive shaft, for example the shaft 45, receives only the useful force resulting from subtracting the other passive forces. In contrast, in traditional multi-cylinder engines the drive shaft is subjected to the entire explosion force of each cylinder, which is then used by that shaft via other connecting rod-crank assemblies to effect the passive stages, i.e. intake, compression and exhaust, in the other cylinders. Traditional engines therefore comprise a drive shaft which in order to transmit a very small useful output torque has to be dimensioned for a very large torque. In addition, to achieve this it has to dissipate the considerable friction engine associated with the movements of usual connecting rod-crank assemblies provided with a usual sliding guide piston. The connecting rods 35, 36, 37, 38 advantageously operate differently from traditional engines, in the sense that they are required to transmit the explosion force less the force required to effect the passive stages in the other cylinders, the transmitted force being only ¼ of the total, which is divided between four connecting rods. This results in such lighter, more economical and more powerful engines. They are more powerful both because they are subjected to less friction and because the absence of rubbing between the pistons and chambers means that the engine can be operated at such higher temperatures, this being well known to increase the efficiency of the thermodynamic cycle. The absence of piston rubbing means that it does not require lubrication, with understandable economical and ecological advantages both because of the elimination of oil dispersion into the air and because of the elimination of oil deterioration caused by the combustible hydrocarbons and the residual combustion products. The only oil required in this version of the invention is for lubricating the cranks, the gear wheels and the pins, the oil then operating in a closed box and never entering the explosion chambers, the oil therefore neither being consumed nor undergoing deterioration. The following operation sequence of the various pistons has been assumed: in chamber 59, intake; in chamber 58, exhaust; in chamber 60, expansion; in chamber 61, compression.

This sequence has been assumed purely by way of example, in that a symmetrical sequence with simultaneous explosion in the two chambers 59 and 60 and so on for the other stages could be considered more valid, with the resultant forces passing through the axis of symmetry and therefore not creating on the crosspiece 41 pairs of forces which transversely stress the pins 39 and 40. With this double operation symmetrical about the axis 44 there is therefore not only a more balanced engine (aided by the compensation achieved by the symmetrical inclination of pairs of connecting rods compared with the single connecting rod typical of traditional engines), but also a lighter engine as it is not stressed by unusable forces. The valves present in the various chambers are not shown in FIG. 3 or in the other figures. This is because they are of the known art and because the various systems can be used for different functions requiring valves of specific type. In FIG. 3, as in FIGS. 5 and 6, the pistons are shown as whole cylinders to which the crosspiece is welded. This means that thin-walled and hence very light tubes can be used. The crosspiece can be constructed of ribbed plate and be therefore very light, so that considering the small size of the connecting rods it is apparent that the reciprocating part of this system has smaller inertia than traditional engines, which are made heavy by much larger connecting rods, more massive pistons and a larger number of thicker and longer steel piston pins. The pistons of the system of the present invention have the following advantages: they do not rub against their chambers; they operate theoretically with zero clearance; they are not subject to the slapping created in traditional connecting rod-crank assemblies by the inclination reversals of the connecting rods and the forces deriving from these.

This means the system of the invention can use pistons suitable for pumping liquids even at very high temperatures without having to use any type of gasket. It can comprise pistons for pumping corrosive liquids, for pumping liquids for food use or generally for pumping liquids which must not be contaminated with lubricants. It can also comprise pistons constructed of relatively fragile material which is light and resistant to very high temperatures (such as ceramics), as they are not subjected to impact or rubbing.

Figure 5:
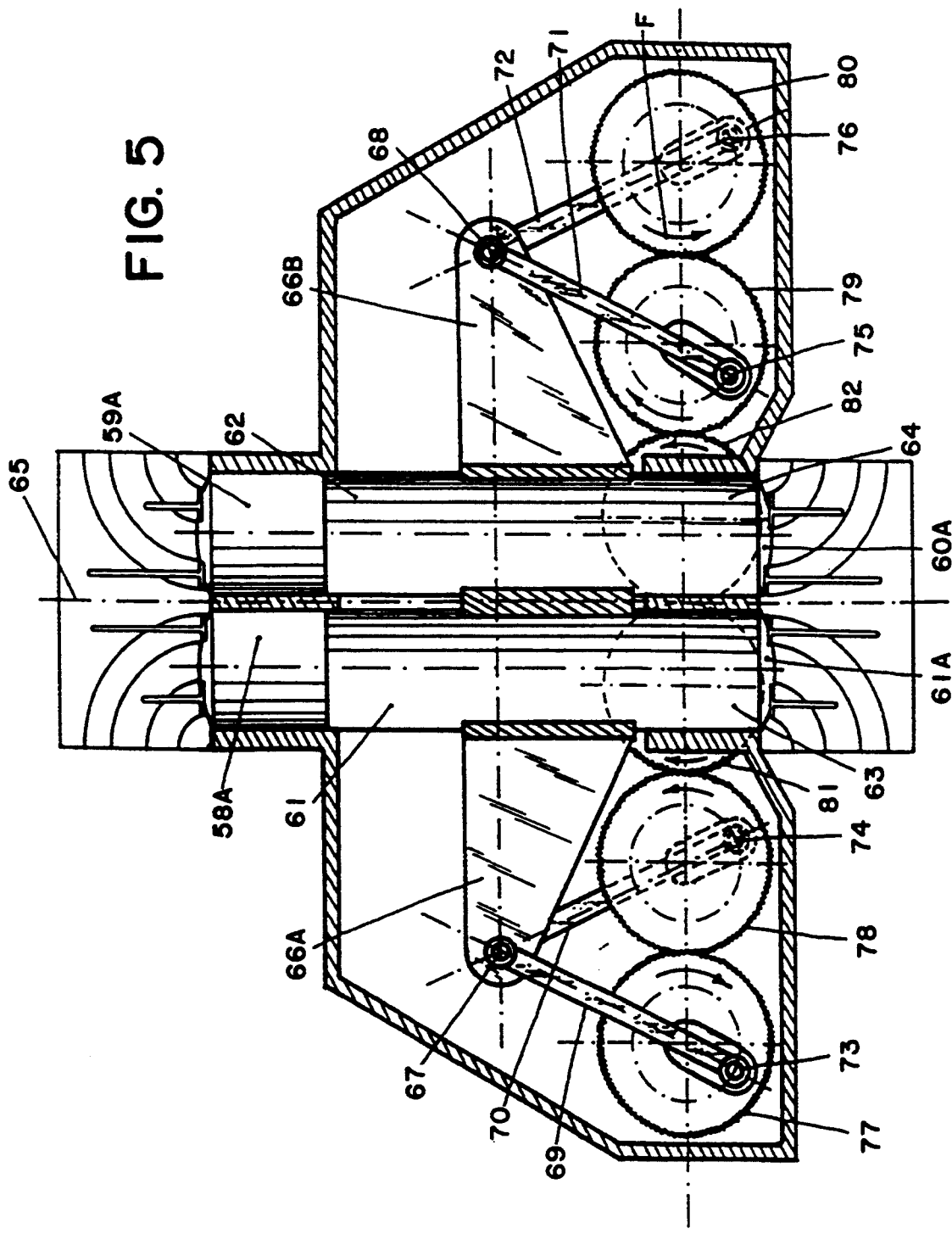
FIG. 5 is a middle cross-section through a further example of a four-cylinder system, with a central double-acting multiple piston and lateral connecting rod assemblies spaced apart, making it suitable as an internal combustion engine.

FIG. 5 shows a version suitable not only for generic use as an internal combustion engine but also for use in which the usual stage sequence followed by the pistons can be varied. In this respect, in contrast to the version of FIG. 3, the pistons 61–63 and 62–64 reciprocating inn chambers 58A–61A and 59A–60A, respectively, have their axes very close to each other, so that they have small arms of action about the axis of symmetry 65, to create only small cross torques on their supporting crosspiece 66A–66B for an equal thrust on each piston head. In addition, the crosspiece 66A–66B is implicitly very long and therefore comprises large reaction arms, resulting in small unbalancing forces to be unloaded onto the pins 67 and 68 which carry the necessary connecting rod pairs 69–70, 71–72. These connecting rods also cooperate with the crankpins 73, 74, 75, 76 rigid with identical mutually engaging gear wheels 77, 78, 79, 80 which rotate in the direction indicated by the arrows f. To achieve continuity of mutual engagement in the indicated directions of rotation, they operate by way of two interposed idle gear wheels 81 and 82. All the gear wheels 77, 78, 81, 82, 79, 80 can operate in the same plane external to the structural outlines of the combustion chambers and cranks, which latter can be fixed to their gear wheels by shafts of any length. FIG. 6 shows a further configuration of the system, comprising two pairs of connecting rods (coupled two by two) 83-84 and 85-86 arranged one above the other (with reference to the drawing), having axes 15A and 14A, respectively. Their crankpins 87, 88, 89, 90 are rigid with gear wheels which engage in pairs, i.e. 91 with 92 and 93 with 94. The gear wheel 91 is also engaged by the gear wheel 93 via an idle gear wheel 95, and the gear wheel 92 is engaged by the gear wheel 94 via an idle gear wheel 96. This achieves the synchronization illustrated in the other versions and necessary to cause the crosspiece 97 to move in the direction 98 while remaining always perpendicular to this direction. The crosspiece can thus impose an equal movement trajectory on its opposing end pistons 99, 100, 101, 102, which slide in their own conjugate chambers 103, 104, 105, 106, to achieve the required volume variability within them.

I claim:

1. A system for transforming rotary motion into reciprocating rectilinear motion, and vice versa, comprising:

at least one pair of side-by-side pistons, each piston having affixed thereto an extending cheek, said cheeks defining a crosspiece, each said piston rectilinearly reciprocable within an associated piston chamber, said crosspiece fixed to said pistons and rectilinearly movable therewith;

first and second common pivot means located on said crosspiece;

a first pair of connecting rods, one end of each of said first pair of connecting rods pivotally connected to said first common pivot means;

a second pair of connecting rods, one end of each of said second pair of connecting rods pivotally connected to said second common pivot means;

a geared wheel associated with each connecting rod, the two wheels associated with each said pair of connecting rods being adjacent and having mutually engageable teeth; and a crank associated with each wheel, each said crank being fixed at the center of its associated wheel and having a pivotal connection with the other end of the connecting rod associated with the same wheel, said pivotal connection being radially spaced from the center of its associated wheel.

2. A system as claimed in claim 1, characterized (FIG. 3) by two pairs of identical connecting rods (35-36 37-38) mounted symmetrically on respective cranks (50-51, 46-47) rigid with their own identical gear wheels (48-49, 52-53), which engage only in pairs, to form opposing systems as in claim 1 in which the pins (42, 43) for commonly supporting their small-ends are spaced apart on a crosspiece (16A) along the common middle axis perpendicular to both the lines joining the axes of rotation of the two pairs of gear wheels (48-49, 52-53), said crosspiece (16A) carrying at its ends two pairs of opposing pistons.

3. The system for transforming rotary motion as claimed in claim 1, wherein at least two of said pistons move in parallel orientation within their respective cylinder chambers.

4. The system for transforming rotary motion as claimed in claim 1, wherein said first and second pivot means are arranged on said crosspiece symmetrically with respect to said at least one pair of pistons.

5. The system for transforming rotary motion as claimed in claim 1, wherein each of said wheels has geared teeth and is associated with each other wheel to form a gear train.

6. A system for transforming rotary motion into reciprocating rectilinear motion, and vice versa, comprising:

at least one pair of side-by-side pistons, each piston having affixed thereto an extending cheek, said cheeks defining a crosspiece, each said piston rectilinearly reciprocable within an associated piston chamber, said crosspiece fixed to said pistons and rectilinearly movable therewith;

first and second common pivot means located on said crosspiece;

a first pair of connecting rods, one end of each of said first pair of connecting rods pivotally connected to said first common pivot means;

a second pair of connecting rods, one end of each of said second pair of connecting rods pivotally connected to said second common pivot means;

a geared wheel associated with each connecting rod, the two wheels associated with each said pair of connecting rods being adjacent and having mutually engageable teeth; and wheel pivot means for pivotally connecting the other end of each connecting rod to its associated wheel, each said wheel pivot means being radially spaced from the center of its associated wheel.

7. The system as claimed in claim 6, wherein:

all of said wheels are identical to each other;

all of said connecting rods are identical to each other; and all of said wheel pivot means are identical to each other and are fixed to their respective wheels in pairs, the wheel pivot means of each wheel pair being located symmetrically about a line perpendicular to the line equidistant from the centers of said pair of wheels and joining their centers.

8. The system for transforming rotary motion as claimed in claim 6, wherein at least two of said pistons move in parallel orientation within their respectively cylinder chambers.

9. The system for transforming rotary motion as claimed in claim 6, wherein said first and second pivot means are arranged on said crosspiece symmetrically with respect to said at least one pair of pistons.

10. The system for transforming rotary motion as claimed in claim 6, wherein each of said wheels has geared teeth and is associated with each other wheel to form a gear train.

* * * * *